United States Patent
Yvon et al.

(10) Patent No.: US 11,027,747 B2
(45) Date of Patent: Jun. 8, 2021

(54) VEHICLE CONTENT BASED SYMBIOSIS FOR VEHICLE OCCUPANTS

(71) Applicant: INTERNATIONAL BUSINESS MACHINES CORPORATION, Armonk, NY (US)

(72) Inventors: Marc Yvon, Antony (FR); Didier Boullery, Sartrouville (FR); Aaron K. Baughman, Silver Spring, MD (US); Todd R. Whitman, Bethany, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 354 days.

(21) Appl. No.: 15/980,079

(22) Filed: May 15, 2018

(65) Prior Publication Data

US 2019/0351915 A1 Nov. 21, 2019

(51) Int. Cl.
*G08G 1/16* (2006.01)
*B60W 50/14* (2020.01)
(Continued)

(52) U.S. Cl.
CPC .......... *B60W 50/14* (2013.01); *B60W 30/085* (2013.01); *B60W 50/0097* (2013.01);
(Continued)

(58) Field of Classification Search
CPC ............... B60W 50/14; B60W 30/085; B60W 50/0097; B60W 50/16; B60W 2050/143;
(Continued)

(56) References Cited

U.S. PATENT DOCUMENTS

| | | | |
|---|---|---|---|
| 9,517,767 B1 | 12/2016 | Kentley et al. | |
| 2012/0062743 A1* | 3/2012 | Lynam | H04N 5/23293 348/148 |

(Continued)

FOREIGN PATENT DOCUMENTS

| | | |
|---|---|---|
| AU | 2011239326 | 11/2013 |
| DE | 102013004271 A1 | 9/2013 |

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

(Continued)

*Primary Examiner* — Dale Moyer
(74) *Attorney, Agent, or Firm* — Scott Dobson, Esq.; Kevin P. Radigan, Esq.; Heslin Rothenberg Farley & Mesiti P.C.

(57) ABSTRACT

Vehicle event processing includes vehicle event detection, notification and/or action response processing. Information relating to a vehicle event is automatically distributed among a plurality of occupants of a vehicle. The plurality of occupants includes a driver of the vehicle and one or more passengers of the vehicle. Based on at least a portion of the information distributed and a perspective of at least one passenger of the one or more passengers, at least one tracking component of the vehicle is adjusted. Based on the adjusting, additional information is obtained. Based on at least a portion of the additional information, an action is automatically taken.

13 Claims, 11 Drawing Sheets

(51) Int. Cl.
*B60W 50/16* (2020.01)
*B60W 30/085* (2012.01)
*B60W 50/00* (2006.01)

(52) U.S. Cl.
CPC ............... *B60W 50/16* (2013.01); *G08G 1/16* (2013.01); *B60W 2050/143* (2013.01); *B60W 2050/146* (2013.01)

(58) Field of Classification Search
CPC ...... B60W 2050/146; B60W 2540/225; G08G 1/16; G06K 9/0085; B60K 2370/149; B60K 2370/194; G06F 3/012; G06F 3/013
See application file for complete search history.

(56) References Cited

U.S. PATENT DOCUMENTS

| | | |
|---|---|---|
| 2015/0092056 A1* | 4/2015 | Rau ................... G06K 9/00791 348/148 |
| 2016/0035154 A1 | 2/2016 | Lejarza et al. |
| 2016/0231746 A1 | 8/2016 | Hazelton et al. |
| 2016/0249191 A1 | 8/2016 | Avrahami et al. |
| 2016/0299617 A1 | 10/2016 | Hanson et al. |
| 2017/0285649 A1 | 10/2017 | Debreczeni |
| 2017/0329329 A1* | 11/2017 | Kamhi ............... G06K 9/00604 |
| 2018/0319336 A1* | 11/2018 | Wikstrom ................ B60Q 9/00 |
| 2019/0197327 A1* | 6/2019 | Mangla .................. G08G 1/167 |
| 2019/0351823 A1* | 11/2019 | Van Der Meijs ...... B60Q 9/008 |

OTHER PUBLICATIONS

Krips, Marco et al., "Camera Based Vehicle Detection and Tracking Using Shadows and Adaptive Template Matching," WSEAS Transactions on Computers, 3(1), Dec. 2003, pp. 38-43.

* cited by examiner

| SPEED (x) | WHEEL (a) | MIRROR (b) | RATIO (y) |
|---|---|---|---|
| 0 | 0 | 0 | 0 |
| 0 | 45 | 0 | 0 |
| 2 | 0 | 0 | 1 |
| 2 | 45 | 45 | 1 |
| 10 | 45 | 40 | 0.9 |
| 25 | 45 | 22 | 0.5 |
| 50 | 45 | 0 | 0 |

FIG. 3B

AUTOMATICALLY DISTRIBUTE INFORMATION RELATING TO A VEHICLE EVENT AMONG A PLURALITY OF OCCUPANTS OF A VEHICLE ~500

THE PLURALITY OF OCCUPANTS INCLUDES A DRIVER OF THE VEHICLE AND ONE OR MORE PASSENGERS OF THE VEHICLE ~502

THE PLURALITY OF OCCUPANTS INCLUDES, E.G., AT LEAST ONE ROBOT ~504

BASED ON AT LEAST A PORTION OF THE INFORMATION DISTRIBUTED AND A PERSPECTIVE OF AT LEAST ONE PASSENGER OF THE ONE OR MORE PASSENGERS, AT LEAST ONE TRACKING COMPONENT (E.G., MIRROR) OF THE VEHICLE IS ADJUSTED ~506

BASED ON THE ADJUSTING, ADDITIONAL INFORMATION IS OBTAINED ~508

BASED ON AT LEAST A PORTION OF THE ADDITIONAL INFORMATION, AN ACTION IS AUTOMATICALLY TAKEN ~510

---

THE AUTOMATICALLY TAKING THE ACTION INCLUDES ALERTING THE DRIVER OR THE VEHICLE TO PERFORM A VEHICLE MANEUVER ~512

THE VEHICLE MANEUVER INCLUDES CHANGING A SPEED OF THE VEHICLE OR ADJUSTING A STEERING WHEEL OF THE VEHICLE ~514

THE ALERTING THE DRIVER INCLUDES PROVIDING A SIGNAL TO ALERT THE DRIVER ~516

THE SIGNAL BEING, E.G, A PHYSICAL CONTACT, A DISPLAY OR A SOUND ~518

FIG. 5A

PASSENGER ALERTNESS OF AT LEAST ONE PASSENGER OF THE ONE OR MORE PASSENGERS OF THE VEHICLE IS FORECASTED ~520

THE ADJUSTING THE AT LEAST ONE TRACKING COMPONENT IS BASED ON THE FORECASTING ~522

THE AUTOMATICALLY DISTRIBUTING INFORMATION INCLUDES CAPTURING AT LEAST A PORTION OF THE INFORMATION VIA AT LEAST ONE WEARABLE DEVICE OF AT LEAST ONE OCCUPANT OF THE VEHICLE, AND PROVIDING THE AT LEAST A PORTION OF THE INFORMATION TO ONE OR MORE OTHER OCCUPANTS OF THE VEHICLE ~526    ~524

ONE OR MORE TRACKING COMPONENTS OF THE VEHICLE SEARCH FOR ONE OR MORE VEHICLE EVENTS, THE SEARCHING DETECTING THE VEHICLE EVENT ~530

POTENTIAL EVENT INFORMATION RELATING TO THE ONE OR MORE VEHICLE EVENTS BEING SEARCHED FOR BY THE ONE OR MORE TRACKING COMPONENTS IS CAPTURED ~532

THE POTENTIAL EVENT INFORMATION THAT IS CAPTURED IS DISTRIBUTED TO ONE OR MORE OCCUPANTS OF THE VEHICLE ~534

PASSENGER ALERTNESS OF AT LEAST ONE PASSENGER OF THE ONE OR MORE PASSENGERS OF THE VEHICLE IS FORECASTED, AND THE POTENTIAL EVENT INFORMATION IS DISTRIBUTED TO THE ONE OR MORE OCCUPANTS, BASED ON PASSENGER ALERTNESS ~538    ~536

FIG. 5B

VEHICLE CONTENT BASED SYMBIOSIS FOR VEHICLE OCCUPANTS

BACKGROUND

One or more aspects relate, in general, to operating vehicles, and in particular, to facilitating the avoiding of collisions during the operating of vehicles.

The driver of a vehicle is presented with a vast amount of information relating to vehicle traffic; traffic signals, such as lights and signs; pedestrian traffic; road conditions, etc. This information is processed by the driver in order for the driver to safely reach its intended destination.

Over the years, enhancements have been provided for the vehicle in order to increase the chances of safe arrival. For instance, a blind spot mirror has been used to reduce blind spots, and alert systems have been added that indicate another vehicle is within a particular area with reference to the vehicle or that braking is required.

SUMMARY

Shortcomings of the prior art are overcome and additional advantages are provided through the provision of a system for facilitating processing of vehicle events. The system includes one or more devices configured to perform a method. The method includes automatically distributing information relating to a vehicle event among a plurality of occupants of a vehicle. The plurality of occupants includes a driver of the vehicle and one or more passengers of the vehicle. Based on at least a portion of the information distributed and a perspective of at least one passenger of the one or more passengers, at least one tracking component of the vehicle is adjusted. Based on the adjusting, additional information is obtained. Based on at least a portion of the additional information, an action is automatically taken.

Computer-implemented methods and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 3B depicts example angle adjustments, in accordance with one or more aspects of the present invention;

FIGS. 5A-5B depict one embodiment of details related to one or more aspects of facilitating processing of vehicle events, in accordance with one or more aspects of the present invention;

DETAILED DESCRIPTION

In accordance with one or more aspects, a vehicle event processing capability is provided that includes, for instance, detection of a vehicle event (e.g., an unsafe driving condition), notification of such an event to one or more occupants of the vehicle, including at least one passenger of the vehicle, and/or action response processing to respond to the event. In one aspect, information relating to a detected vehicle event is automatically distributed among a plurality of occupants of the vehicle, including the driver and at least one passenger. The detected vehicle event is tracked and one or more occupants of the vehicle are alerted using, for instance, tracking components that work in concert utilizing content (information) based symbiosis to track the event and alert the occupants. Based on the alert, an occupant may focus on capturing a view (additional information) relating to the event that is within their domain proximity (perspective). To obtain the additional information, one or more tracking components of the vehicle may be automatically adjusted, based on an occupant's perspective (e.g., view of the occupant), to provide a better view and the additional information.

A vehicle may be a car, truck, recreational vehicle, motorcycle, boat or other types of vehicles, as examples. Further, a tracking component may be any component used to track an event and/or obtain information. A tracking component may have one or more sensors and may be a tracking component of a vehicle, including, but not limited to, a mirror, camera, sensor, other tracking device, processor, etc. that is within the vehicle, mounted on the vehicle or around the vehicle (e.g., communicatively coupled thereto); and/or a tracking component of an occupant, such as a wearable device. A wearable device may be, for instance, a watch, ring, bracelet, necklace, other jewelry, headband, blanket, vest, jacket, glasses, etc., that is worn by, on or in proximity to an occupant. The wearable device is capable of sensing, obtaining information and/or providing information to another tracking component and/or other devices that may be used for processing other than tracking, such as a processor, etc.

One embodiment of vehicle event processing is described with reference to FIG. 1. One or more aspects of this processing may be performed by one or more devices, including, for instance, one or tracking components, and/or one or more other devices that may be used for other than tracking, such as, but not limited to a processor (e.g., a hardware or physical processor). Other examples exist.

Figure 1:
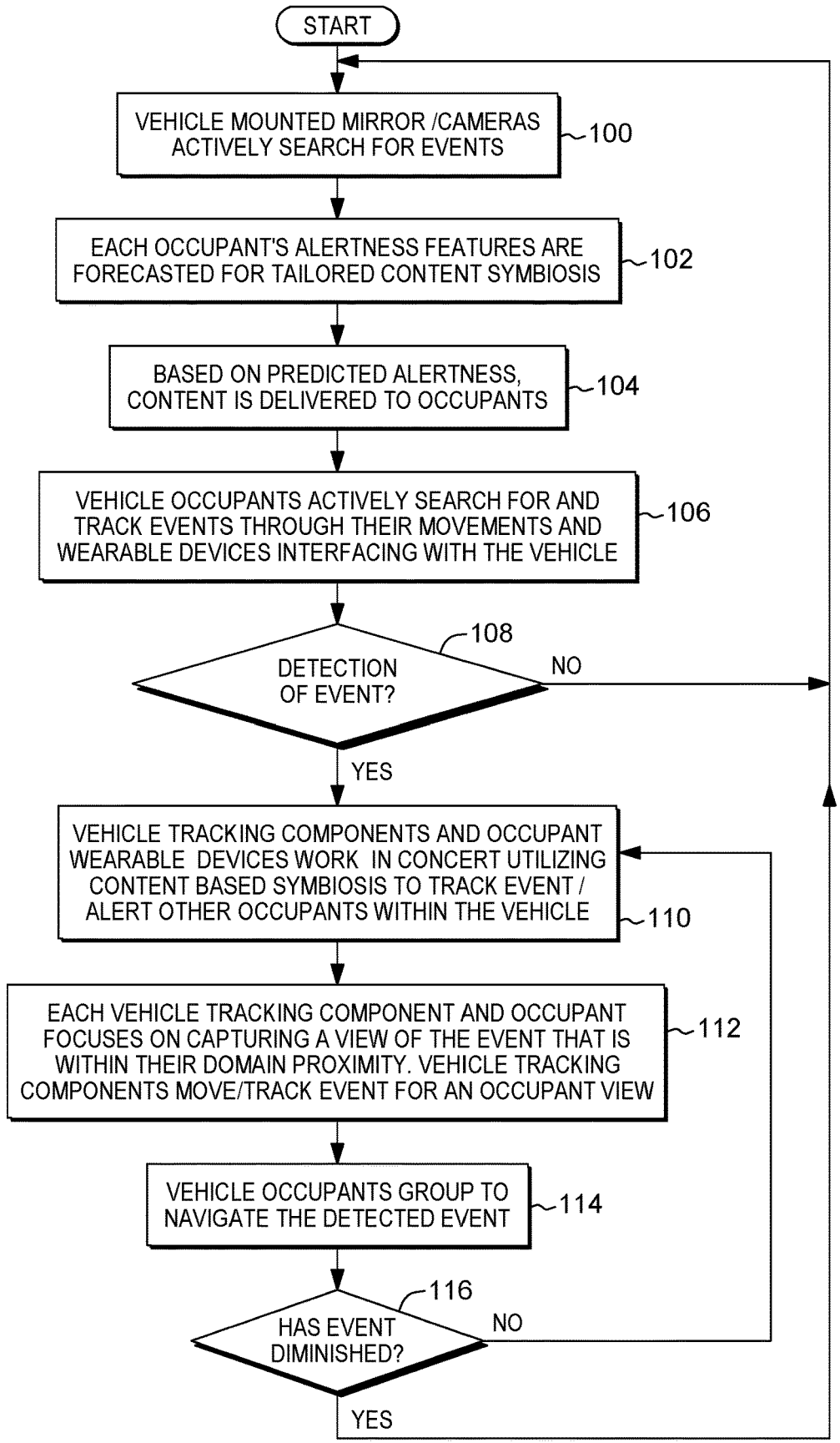
FIG. 1 depicts one example of vehicle event processing logic, in accordance with one or more aspects of the present invention.

Referring to FIG. 1, in one example, a search is performed looking for one or more vehicle events, STEP 100. This searching may be accomplished by one or more tracking components. As a particular example, one or more mirrors and/or cameras are used to actively search for events in proximity to the vehicle, such as objects, including other vehicles, pedestrians, bicyclists, and/or obstructions, as examples.

Additionally, alertness features are forecasted for participants of the processing, such as one or more occupants of the vehicle, STEP 102. The occupants may be human occupants, robotic occupants or a combination of human and robotic occupants, as examples. The alertness features provide an indication for each occupant in which alertness is being forecasted (e.g., all of the occupants of the vehicle or select occupants) of the predicted alertness of the occupant. This may be determined by sensing physical movement of the occupant; sensing eye movements of the occupant; detecting an action by the occupant, such as providing a signal via a wearable device; and/or by other means.

Based on the predicted alertness, information (also referred to as content) associated with the search for vehicle events is delivered to one or more occupants of the vehicle, STEP 104. For instance, the information may be delivered to any occupants deemed to be paying attention or alert. This may be based on a sliding scale of predicted alertness. For instance, on a scale of 1-10, an occupant having a predicted alertness of, e.g., 5-10 may be deemed to be paying attention. Many possibilities exist. However, if it is determined that an occupant is not alert (e.g., sleeping, eyes closed, etc.; predicted alertness below, e.g., 5), then information may not be delivered to that occupant or it may be delivered in a particular manner (e.g., via a noise, physical contact, etc.). The information may include an indication of a potential or actual safety concern with the vehicle, with an occupant of the vehicle, with another vehicle (e.g., changing lanes, changing speed, etc.) and/or of a person or other entity approaching the vehicle, as examples. The information may be delivered via a variety of mechanisms, including via a signal (e.g., noise), physical contact, via a wearable device, etc.

Moreover, in one example, one or more of the occupants actively track and/or search for the vehicle events, STEP 106. This may be accomplished by occupants using one or more of their senses (e.g., sight, hearing, etc.) and/or via a wearable device that interfaces with the vehicle, such as a device that interfaces with one or more tracking components. This tracking/searching may be initiated based on receiving the delivered information or independent thereof. In one embodiment, this tracking/searching may be commenced by an occupant turning on a feature of the wearable device. Many possibilities exist.

A determination is made as to whether a vehicle event has been detected, INQUIRY 108. For instance, has a dangerous vehicle situation, an approaching or departing pedestrian, or another event been detected that is to be addressed? If a vehicle event has not been detected, then processing continues with STEP 100. Otherwise, processing continues with tracking the event and/or alerting one or more occupants of the event, STEP 110. For instance, one or more tracking components of the vehicle (e.g., sensors, mirrors, cameras, etc.), one or more occupants of the vehicle, and/or one or more tracking components of one or more occupants (e.g., wearable devices) of the vehicle work in concert utilizing content based symbiosis to track the detected event and/or to alert one or more occupants regarding the event. That is, each of the tracking components and/or occupants (or select ones thereof) collects information regarding the particular event, which is then provided to the driver, to other occupants, and/or to one or more devices in order to continue to collect additional information.

Each tracking component of the vehicle (e.g., sensor, camera, mirror, etc.), occupant and/or other tracking components (or select ones thereof) focuses on capturing a view of the event that is within their domain proximity, STEP 112. Tracking components may move/track the event for an occupant's view. For instance, a mirror or camera may be adjusted based on the view of the occupant and the received information regarding the vehicle event. An example of this is described further below.

The vehicle occupants (or at least one passenger and the driver) group together to navigate the detected event, STEP 114. This may include sharing the content learned and based thereon, alerting the driver or the vehicle (e.g., automatically or manually) of an action to be taken, such as turning the vehicle, changing speed of the vehicle, changing lanes, applying the brake, etc. Many possibilities exist.

A determination is made as to whether the event has, at least, diminished, INQUIRY 116. If the event has not diminished, then processing continues with STEP 110; otherwise, processing continues with STEP 100.

In accordance with one or more aspects, monitoring and situational awareness of occupants of a vehicle are leveraged to increase safety. The bandwidth of the occupants is forecasted so that sensors or other tracking components in and around the vehicle can actively adapt, increasing safety and potentially saving lives. This improves one or more technical fields, including vehicle safety for occupants within the vehicle from dangers provided by other vehicles while travelling, by occurrences within the vehicle (e.g., sickness), or by persons or other entities approaching the vehicle while stationary.

As described herein, a vehicle event processing capability is provided that distributes sensory load and computation to occupants of a vehicle, provides optimal relative perspective of sensing, provides group sensing, forecasts alertness and visual stimulus of one or more occupants, forecasts camera, mirror and/or other device efficacy, and/or automatically adapts tracking components of a vehicle, such as mirrors, cameras, sensors etc. Imminent dangers are identified, monitoring and visual stimuli are distributed throughout the occupants of a vehicle, and tracking components on and around the vehicle dynamically identify, adjust and track detected events/actions based on where the ambient feed is forecasted to go when the vehicle is in motion or stationary. Further, a self-improving training mechanism is provided that rapidly identifies events and continues to learn. User recognition data and authorized operations for identified and authorized individuals are built, used and/or refreshed. A cognitive vehicle determines operations allowed for individuals using a level of access/operation assigned to the recognized individual.

One or more aspects of the present invention assist in addressing information overload of drivers contributed to by, for instance, high density traffic, traffic lights, signs, pedestrian traffic, etc. The combination of augmented reality and sensors throughout a vehicle, along with dynamic and changing infrastructure further increase information on drivers. Information overload during driving situations is a common cause of collisions, accidents or inefficient path planning, and thus, one effect of the vehicle event processing capability of one or more aspects of the invention is to reduce the collisions, accidents or inefficient path planning, as examples. The information available to the driver is enhanced based on events processed by other occupants within the vehicle, providing more streamlined and/or pertinent information and reducing information noise.

In one aspect, automatic adjustments to tracking components (e.g., tracking components of the vehicle) may be made in order to provide additional and/or enhanced information to the driver of the vehicle or to the vehicle itself. As examples, mirrors, cameras and/or other such devices of the vehicle may automatically be adjusted based on a vehicle event being tracked and/or information related to potential vehicle events. One example of this is described further with reference to FIG. 2.

Figure 2:
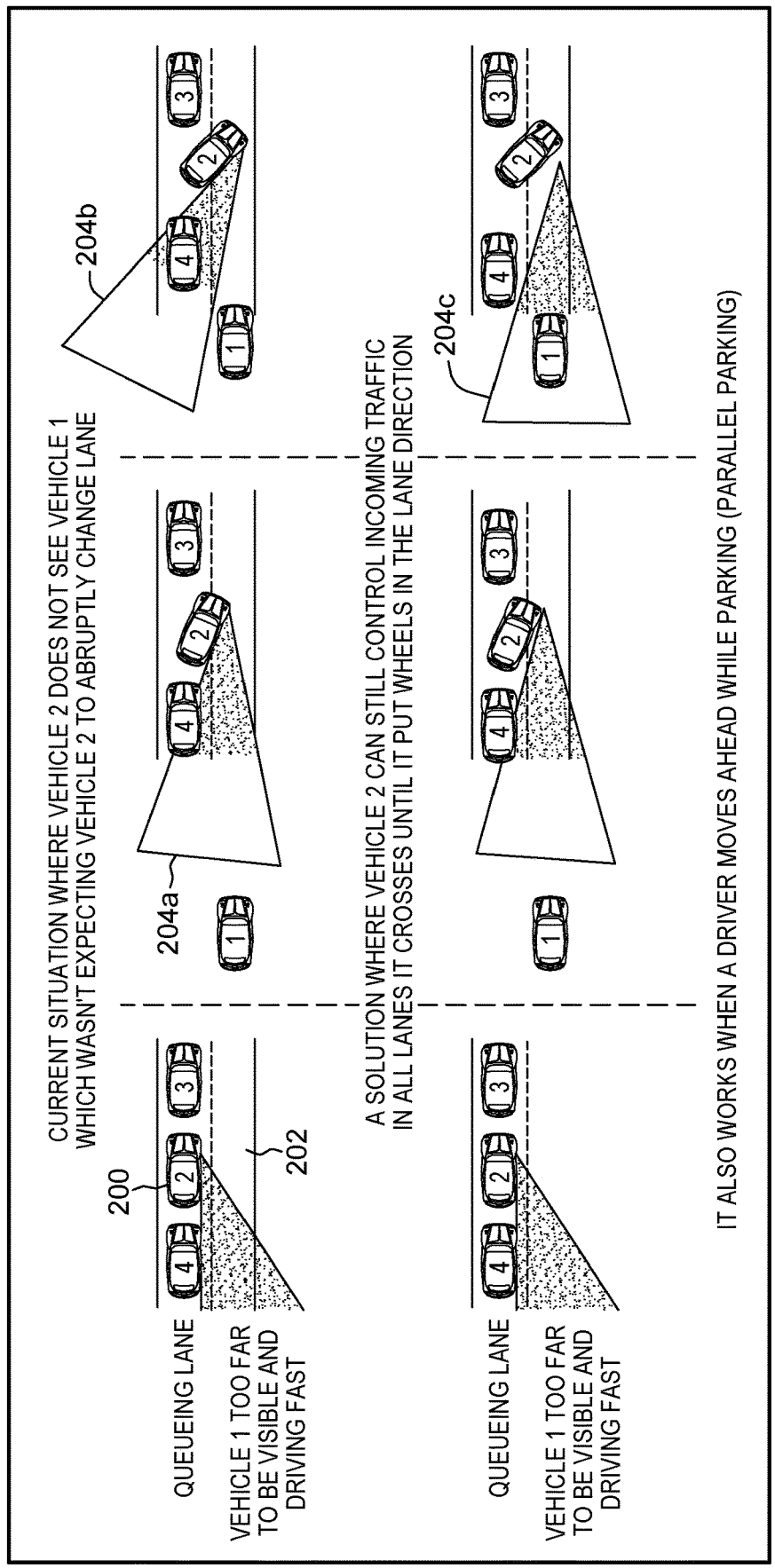
FIG. 2 depicts an example of vehicle event detection and occupant notification for appropriate action, in accordance with an aspect of the present invention.

As shown in FIG. 2, there are a plurality of vehicles 200 (e.g., cars) travelling along a road 202 on, e.g., the left-hand side (driver is on the right in this example). In this example, one lane has three vehicles (vehicles 4, 2, 3) and another lane has another vehicle (vehicle 1) driving at a fast speed and behind the other three vehicles. As indicated by triangle 204a, which represents what may be seen by one or more tracking components of vehicle 2, vehicle 1 is not visible to the driver of vehicle 2. In this particular example, the one or more tracking components are mirrors, but in other examples, they may be cameras, other devices, and/or a combination of mirrors, cameras and other such devices. Further, if vehicle 2 makes a sudden move to the lane in which vehicle 1 is travelling, the angle seen by the mirror as indicated by 204b still does not allow the driver of vehicle 2 to see vehicle 1. This may result in a collision.

Thus, in accordance with an aspect of the present invention, as shown at 204c, the mirror of vehicle 2 is automatically adjusted based on, e.g., the movement of vehicle 2 and/or information obtained regarding a vehicle event, such that the driver of vehicle 2 can see vehicle 1. This allows the driver of vehicle 2 to take a precautionary action (e.g., move back into its original lane, increase speed, etc.) to avoid a collision.

Figure 3A:
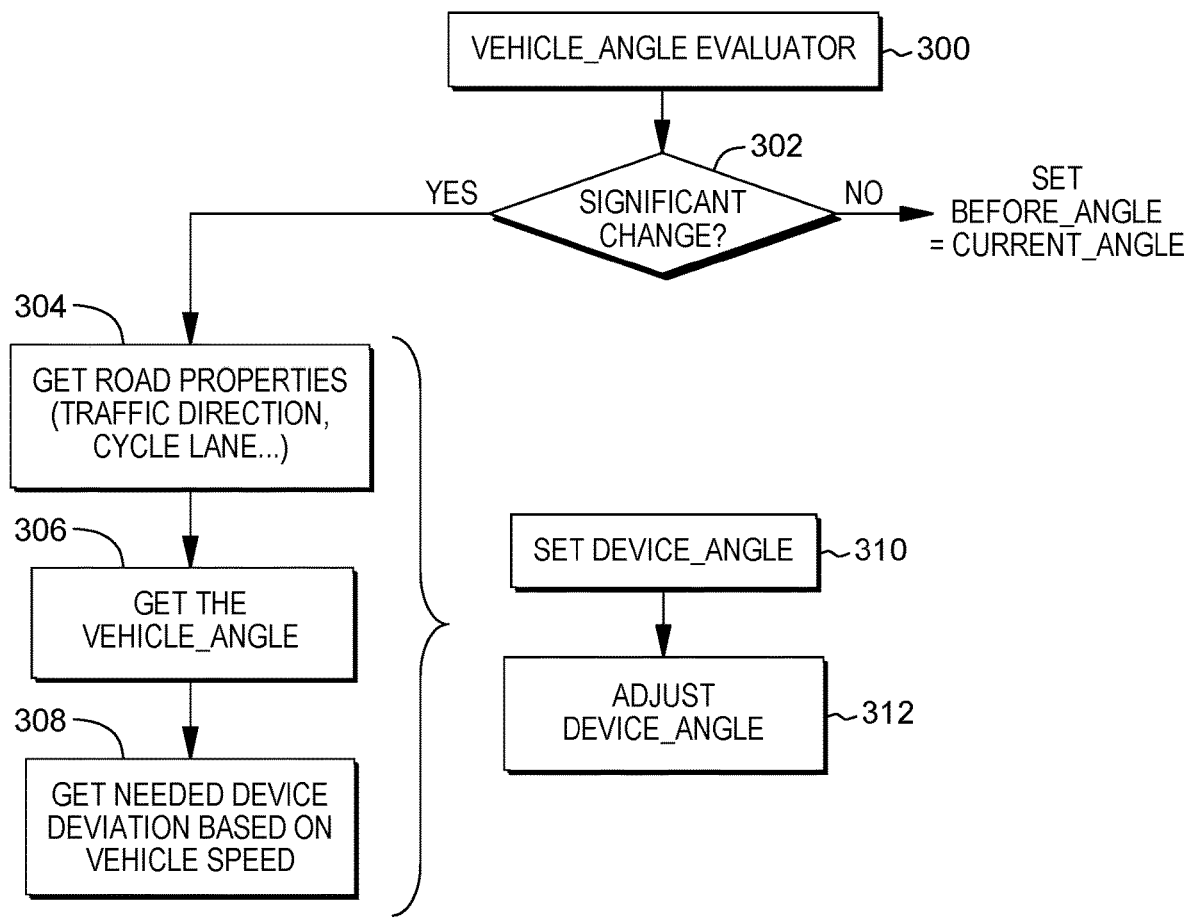
FIG. 3A depicts one embodiment of logic to adjust a tracking component (e.g., mirror/camera) used to track a vehicle event, in accordance with one or more aspects of the present invention.

Further details regarding automatically adjusting a vehicle's tracking component, such as a mirror, camera or other such device, are described with reference to FIG. 3A. Initially, an angle of the vehicle, Vehicle_Angle, is determined, STEP 300. This may be performed by an evaluator, such as a processor, a sensor or other device. In one example, the vehicle angle may be based on speed of the vehicle and a unit vector. The unit vector has, e.g., three components, i (x direction), j (y direction) and k (z direction—i.e., if the car leaves the ground due to a bump). The different unit components have a value from 0-1 and can be used to determine the speed of the vehicle in a general direction. For instance, the speed is multiplied by the value of each unit component to determine the speed in the general direction. This may be used to determine the appropriate tracking components to be adjusted.

A determination is made as to whether the vehicle has moved, such that there is a significant change to the angle of the vehicle (e.g., vehicle abruptly begins to change lanes), INQUIRY 302. If there is no significant change, then Before_Angle of the vehicle is set equal to Current_Angle, which is the current Vehicle_Angle. Processing then continues with evaluating the vehicle angle, in one embodiment.

However, if there has been a significant change in the angle of the vehicle, the angle of a tracking component (e.g., mirror, camera, other device) is adjusted based on the new vehicle angle. In one example, road properties (e.g., traffic direction, cycle lane, etc.) are obtained via one or more tracking components or other devices, STEP 304, and used, for instance, to determine which one or more tracking devices of the vehicle are to be adjusted. For instance, if the driver is on the right, then a mirror on the right may be selected. Other possibilities also exist. Further, the Vehicle_Angle is obtained, STEP 306, as well as the desired device (i.e., tracking component) deviation, based, for instance, on vehicle speed, STEP 308. Moreover, Device_Angle is set to a current angle of the tracking component being adjusted, STEP 310. Then, based on, for instance, Vehicle_Angle and/or device deviation, the Device_Angle is adjusted, STEP 312, as described below.

Further details regarding adjusting the angle of a tracking component, Device_Angle, are described with reference to FIG. 3B. Let "a" equal the angle of the vehicle in degrees (e.g., angle of the steering wheel or other determination of an angle of the vehicle); "b" equal an angle in degrees of the tracking component (e.g., mirror); and ratio "y" equal b/a. Then, as examples, when the speed (x) is equal to 0, the ratio is 0, so no deviation; when the speed is 2, the ratio is 1, so full deviation; and when the speed is equal to 25, the ratio is 0.5, and the mirror deviation is half the wheel deviation. As indicated, in one embodiment, as the speed increases, the angle deviation is less.

One example of logic to adjust the angle of a tracking component, Device_Angle, is described with reference to FIG. 4. This logic may control more than one tracking component switching from one view to another. It may be performed by one or more processors and/or one or more other components.

Figure 4:
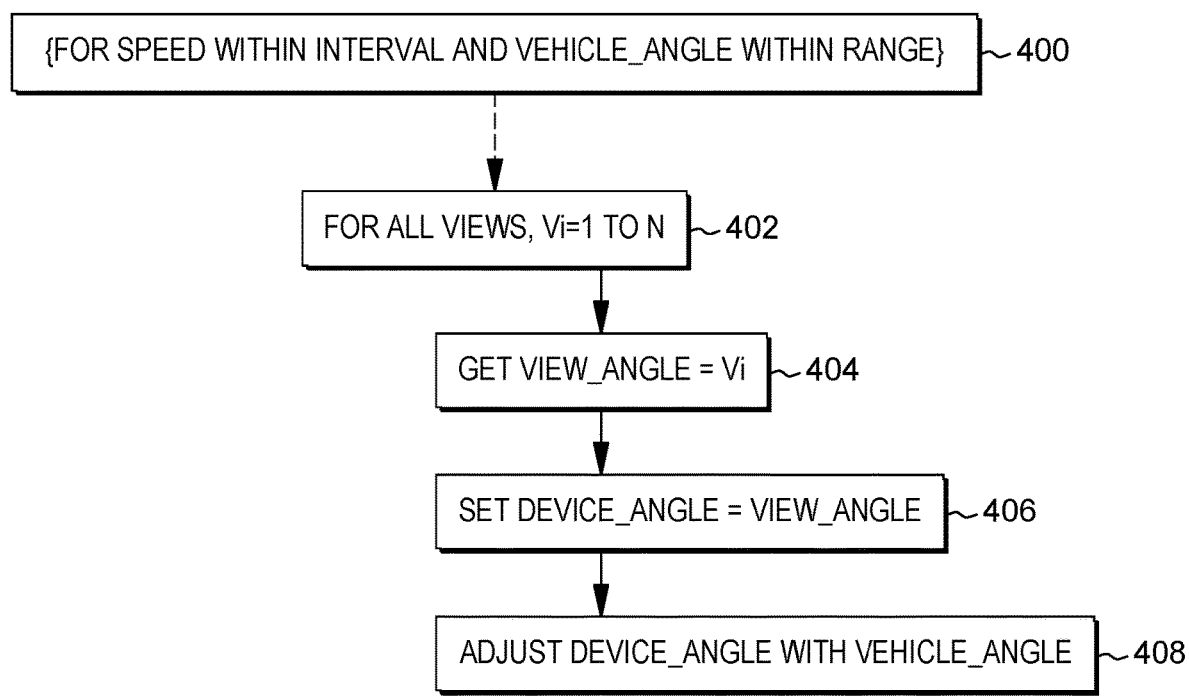
FIG. 4 depicts another embodiment of logic to adjust a tracking component (e.g., mirror/camera) used to track a vehicle event, in accordance with one or more aspects of the present invention.

Referring to FIG. 4, in one example, this logic is performed when, for instance, the speed of the vehicle is within a selected interval and the Vehicle_Angle is within a pre-specified range (400). The interval and range may depend on the type of vehicle event, urgency, given speed and/or distance, as examples. As a particular example, if the vehicle is travelling at a rate of speed greater than, e.g., 5 mph under the speed limit and above, and the steering wheel is, e.g., 10 degrees off center, then a tracking component may be adjusted, as described herein. Many variations and examples are possible for initiating the adjusting logic. For each of the views, Vi=1 to N (i.e., for each mirror, camera and/or other device selected to be monitored and automatically adjusted) (402), a View_Angle is obtained (404). Further, Device_Angle is set equal to the View_Angle (406), and Device_Angle is adjusted based on the Vehicle_Angle (408), as described with reference to FIG. 3B. Variations and other embodiments are possible.

The automatically adjusting of the one or more tracking components (e.g., mirrors, cameras or other such devices) may be based on the angle of the vehicle, and/or on information obtained by one or more passengers of the vehicle using one or more aspects of the present invention.

Further details relating to one embodiment of facilitating processing of vehicle events are described with reference to FIG. 5A-5B. One or more of these aspects improve a technical field of vehicular operation, collision avoidance, and/or machine learning, as examples. Further, technological improvements are provided in automatically adjusting tracking components to be used to facilitate driving and improve safety.

Referring to FIG. 5A, information relating to a vehicle event is automatically distributed among a plurality of occupants of a vehicle (500). The plurality of occupants includes, for instance, a driver of the vehicle and one or more passengers of the vehicle (502). In one particular example, the plurality of occupants includes at least one robot (504). Based on at least a portion of the information distributed and a perspective of at least one passenger of the one or more passengers, at least one tracking component (e.g., a mirror) of the vehicle is adjusted (506). Based on the adjusting, additional information is obtained (508). Further, based on at least a portion of the additional information, an action is automatically taken (510).

The action may include alerting the driver or the vehicle to perform a vehicle maneuver (512). Example vehicle maneuvers include changing a speed of the vehicle, adjusting a steering wheel of the vehicle, or braking (514). Further, in one example, the alerting the driver includes providing a signal to alert the driver (516). The signal may be, for instance, a physical contact, a display or a sound (518).

In one aspect, referring to FIG. 5B, passenger alertness of at least one passenger of the one or more passengers of the vehicle is forecasted (520), and the adjusting the at least one tracking component is based on the forecasting (522).

As one example, the automatically distributing information includes capturing at least a portion of the information via at least one wearable device of at least one occupant of the vehicle (524), and providing the at least a portion of the information to one or more other occupants of the vehicle (526).

In one aspect, one or more tracking components of the vehicle search for one or more vehicle events, and detect the vehicle event (530). Further, in one embodiment, potential event information relating to the one or more vehicle events being searched for by the one or more tracking components is captured (532), and the potential event information that is captured is distributed to one or more occupants of the vehicle (534). In yet a further embodiment, passenger alertness of at least one passenger of the one or more passengers of the vehicle is forecasted (536), and the potential event information is distributed to the one or more occupants, based on passenger alertness (538).

Other variations and embodiments are possible.

One or more aspects provide vehicle accident avoidance, in which one or more tracking components (e.g., mirrors, cameras, sensors) are monitored and one or more of the tracking components are adjusted based on a passenger's perspective. To avoid information overload, visual load is distributed among passengers in the vehicle based on, e.g., forecasted passenger alertness for the distributed workload. Forecasted adjustments are made to one or more tacking components based on vehicle conditions, tracking the actions so that the optimal view point is distributed and presented to the appropriate vehicle occupant(s), including, in one example, robotic actors. In one example, the bandwidth of humans and robots are forecasted so that tracking components in and around a vehicle can actively adapt when an exterior action occurs (such as another vehicle making unsafe land changes) and send a notification to a vehicle occupant.

In one aspect, collaborative driving is performed, in which passengers of a vehicle assist the driver. Examples of such assistance are provided below:

1) Symbiosis with: one passenger (Robot or Human)=>Driver (Robot or Human)—in this case, the system senses the passenger's actions/reactions, and warns the driver accordingly.

The passenger seated on the car's rear seat
  observes that the tire of the car driving on the passenger's left side (left lane) has just exploded;
  anticipates a direction change from this car to happen any time soon.
The driver (in $1^{st}$ lane) may only watch the $2^{nd}$ lane in his mirror, not the $3^{rd}$ or $4^{th}$ when the car is at the same level.
The system gets notified by the interpretation of the passenger's reaction.

This notification may come from, e.g.,
  any quantified self-measurement and change of a wearable (heart beat) or any other metrics.
  any abnormal body motion.
  any other factual information, such as where the passenger was looking when reacted.

2) Symbiosis with the: Driver (Robot or Human)=>passenger (Robot or Human)=>Driver (Robot or Human)
  In this case, the driver delegates (off loads) some tasks.
  While driving on an icy road, the driver
  focuses all of the driver's attention to the driving commands (steering, braking, decelerating, accelerating . . . )
  delegates to passenger low prioritization tasks such as: looking at signals, maps, directions, surrounding vehicles . . . .
The system gathers the delegation of tasks from the on-board occupants and notifies the driver about the gathered information for action.

3) Symbiosis with: the passenger (Robot or Human) =>Driver (Robot or Human)=>passenger (Robot or Human) =>Driver (Robot or Human).
  In this case, there are some anticipations to happen.
  While driving in a tough condition
  a) The passenger observes an alert on a driving condition from a road information board or similar information device/signal
  b) The system lets the driver know
    the passenger got the information
    the passenger is put/puts him/herself on vigilance mode
  c) The passenger notifies the driver while approaching closer to the danger or case 1) applies at that time.

Many other use cases are possible. Further, in one or more use cases, one or more tracking components are used and may be adjusted automatically, based on the passenger's viewpoint, in order to provide enhanced information to be used by the driver.

One example of a computer system that includes processors that may be used by one or more aspects of the present invention is described with reference to FIG. 6A. In this example, the computer system is part of a computing environment including additional components that may or may not be used by aspects of the present invention.

Figure 6A:
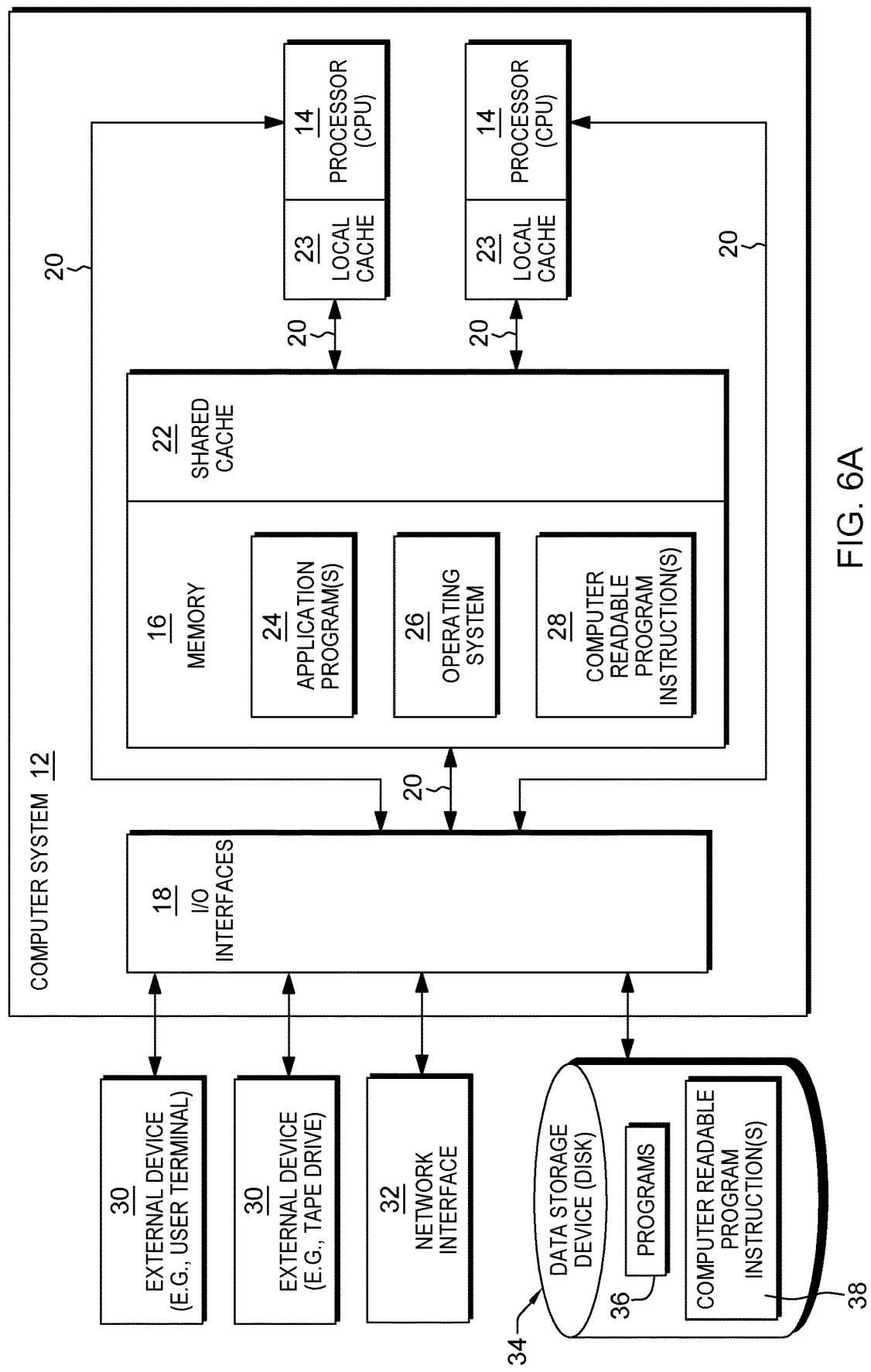
FIG. 6A depicts one example of a computing environment to incorporate and use one or more aspects of the present invention.

As shown in FIG. 6A, a computing environment 10 includes, for instance, a computer system 12 shown, e.g., in the form of a general-purpose computing device. Computer system 12 may include, but is not limited to, one or more processors or processing units 14 (e.g., central processing units (CPUs)), a memory 16 (a.k.a., system memory, main memory, main storage, central storage or storage, as examples), and one or more input/output (I/O) interfaces 18, coupled to one another via one or more buses and/or other connections 20.

Bus 20 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 16 may include, for instance, a cache 22, such as a shared cache, which may be coupled to local caches 23 of processors 14. Further, memory 16 may include one or more programs or applications 24, an operating system 26, and one or more computer readable program instructions 28. Computer readable program instructions 28 may be configured to carry out functions of embodiments of aspects of the invention.

Computer system 12 may also communicate via, e.g., I/O interfaces 18 with one or more external devices 30, one or more network interfaces 32, and/or one or more data storage devices 34. Example external devices include a user terminal, a tape drive, a pointing device, a display, etc. Network interface 32 enables computer system 12 to communicate with one or more networks, such as a local area network (LAN), a general wide area network (WAN), and/or a public network (e.g., the Internet), providing communication with other computing devices or systems.

Data storage device 34 may store one or more programs 36, one or more computer readable program instructions 38, and/or data, etc. The computer readable program instructions may be configured to carry out functions of embodiments of aspects of the invention.

Computer system 12 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 12. Examples, include, but are not limited to: microcode, device drivers, redundant processing units, external disk drive arrays, RAID systems, tape drives, and data archival storage systems, etc.

Computer system 12 may be operational with numerous other general purpose or special purpose computing system environments or configurations. Examples of well-known computing systems, environments, and/or configurations that may be suitable for use with computer system 12 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In one example, a processor, such as processor 14, may execute one or more components to perform one or more aspects of the present invention. These components may be stored in memory, including main memory (e.g., memory 16) and/or one or more caches (e.g., shared cache 22, local cache 23) and/or external storage (e.g., device 34), and may be executed by one or more processors (e.g., processor 14).

Figure 6B:
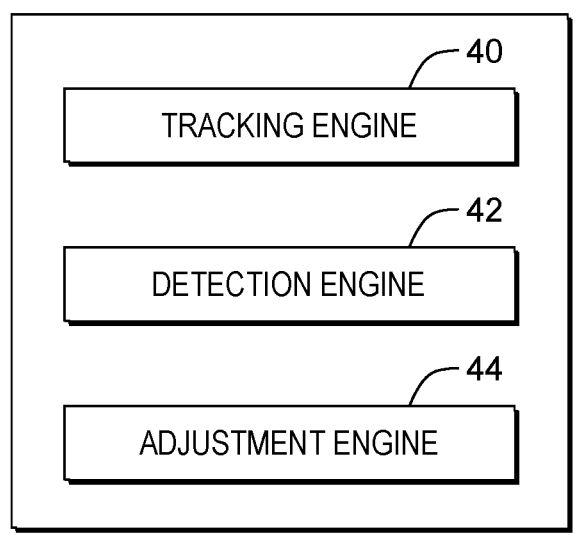
FIG. 6B depicts further details of a processor of FIG. 6A, in accordance with one or more aspects of the present invention.

In one example, referring to FIG. 6B, the components may include a tracking engine 40 used in searching for and/or tracking vehicle events; a detection engine 42 used in detecting a particular vehicle event; and an adjustment engine to automatically adjust one or more tracking components. The components executed by a processor may be individual components or combined in one component. Further, other components may be included to perform one or more other tasks, such as an action engine that initiates an action to be taken (such as turning the steering wheel, increasing/decreasing speed, braking, etc.) based on information obtained by one or more occupants of the vehicle. Many variations are possible.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
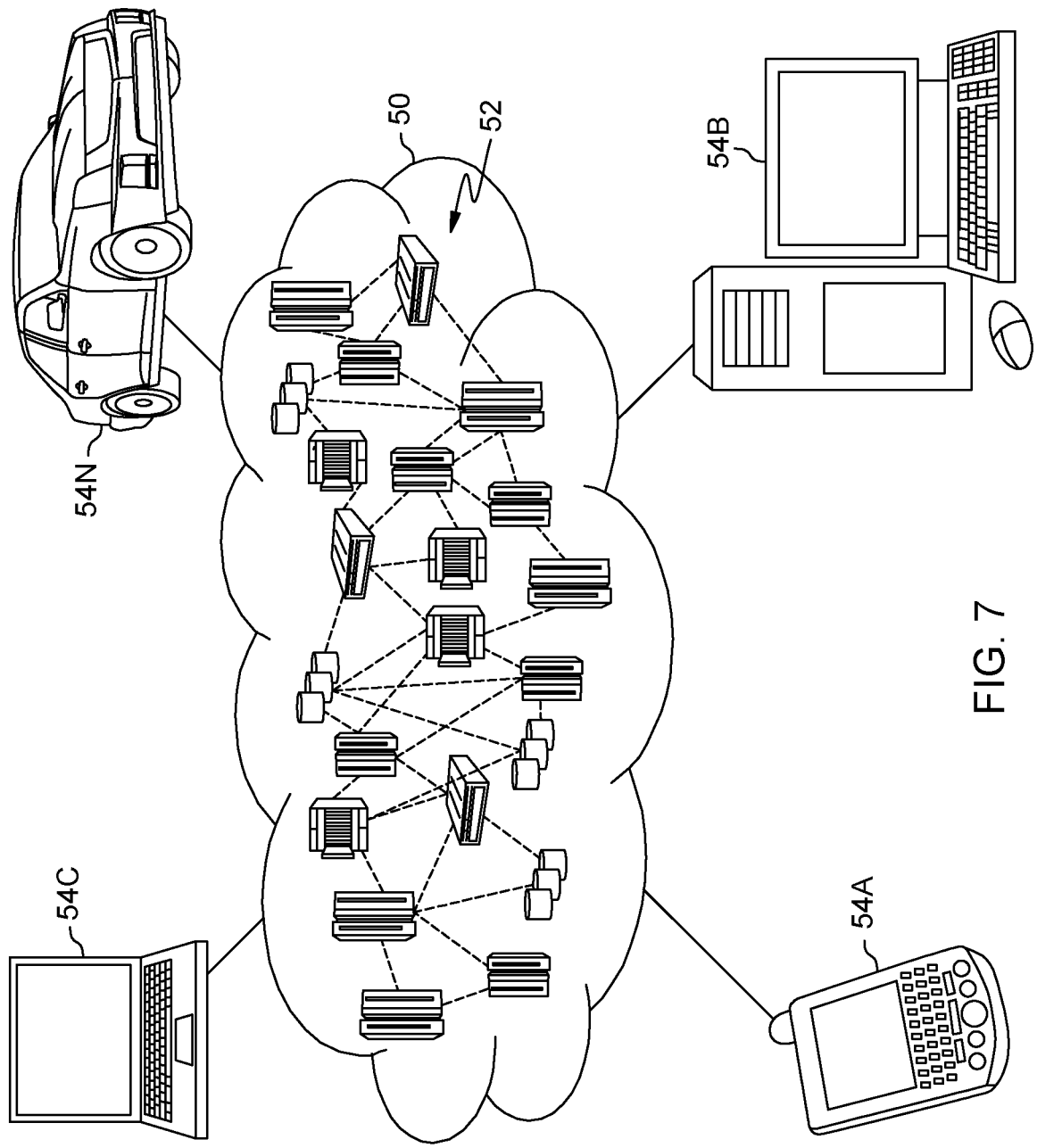
FIG. 7 depicts one embodiment of a cloud computing environment.

Referring now to FIG. 7, illustrative cloud computing environment 50 is depicted. As shown, cloud computing environment 50 comprises one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 52 and cloud computing environment 50 can communicate with any type of computerized device over any type of network and/or network addressable connection (e.g., using a web browser).

Figure 8:
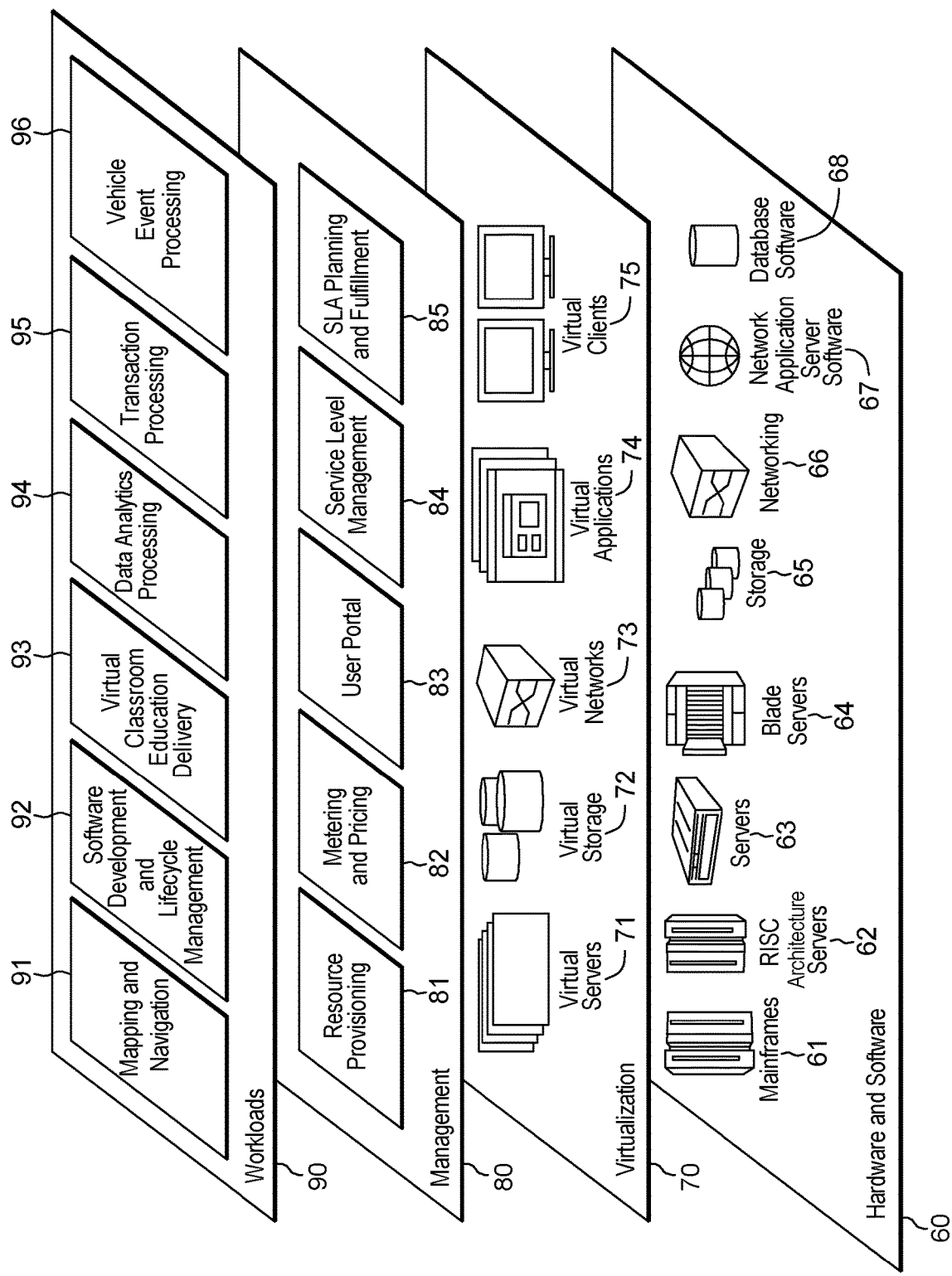
FIG. 8 depicts one example of abstraction model layers.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and vehicle event processing 96, which includes, for instance, vehicle event detection, notification and/or action response processing.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other types of devices and/or tracking components may be used in one or more embodiments. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A system for a vehicle to facilitate navigating one or more vehicle events, the system comprising:
    a plurality of cameras that generate image data to facilitate detecting a vehicle event;
    a memory; and
    a processor communicatively coupled to the plurality of cameras and the memory, wherein the system performs a method comprising:
        detecting, by the processor, the vehicle event based on generated image data that is received from one or more cameras of the plurality of cameras;
        automatically distributing, by the processor, a notification relating to the vehicle event to occupants of the vehicle;
        determining, by the processor, a view of an occupant of the occupants of the vehicle, the view of the occupant being determined based on perspective image data, indicative of the view of the occupant, from a camera of the plurality of cameras;
        adjusting at least one camera of the plurality of cameras based on at least a portion of the notification distributed and the perspective image data;
        obtaining, based on the adjusting, additional image data on the vehicle event from one of the plurality of cameras; and
        automatically taking an action to facilitate navigating the vehicle event, the automatically taking the action being based on at least a portion of the additional image data.

2. The system of claim 1, wherein the method further comprises forecasting, based on the perspective image data, alertness of one or more of the occupants of the vehicle, and wherein the adjusting the at least one camera is based on the forecasting.

3. The system of claim 1, wherein the occupants of the vehicle include a driver of the vehicle and the automatically taking the action includes alerting the driver or the vehicle to perform a vehicle maneuver.

4. The system of claim 3, wherein the vehicle maneuver includes changing a speed of the vehicle or adjusting a steering wheel of the vehicle.

5. The system of claim 3, wherein the alerting the driver comprises providing a signal, via an electronic device, to alert the driver, the signal being selected from a group consisting of: a physical contact, a display and a sound.

6. The system of claim 1, wherein the method further comprises:
    forecasting, based on the perspective image data, alertness of one or more of the occupants of the vehicle; and
    wherein the automatically distributing the notification relating to the vehicle event is based, at least in part, on the forecasted alertness of the one or more of the occupants of the vehicle.

7. The system of claim 1, wherein the occupants of the vehicle include at least one robot.

8. A method of facilitating navigating one or more vehicle events, the method comprising:
    detecting, by a processor, a vehicle event of a vehicle, the vehicle event being detected based on image data received from one or more cameras of a plurality of cameras communicatively coupled to the processor;
    automatically distributing, by the processor, a notification relating to the vehicle event to occupants of the vehicle;
    determining, by the processor, a view of an occupant of the occupants of the vehicle, the view of the occupant being determined based on perspective image data, indicative of the view of the occupant, obtained from a camera of the plurality of cameras;
    adjusting at least one camera of the plurality of cameras based on at least a portion of the notification distributed and the perspective image data;
    obtaining, based on the adjusting, additional image data on the vehicle event from one of the plurality of cameras; and
    automatically taking an action to facilitate navigating the vehicle event, the automatically taking the action being based on at least a portion of the additional image data.

9. The method of claim 8, further comprising forecasting, based on the perspective image data, alertness of one or more occupants of the vehicle, and wherein the adjusting the at least one camera is based on the forecasting.

10. The method of claim 8, wherein the occupants of the vehicle include a driver of the vehicle and the automatically taking the action includes alerting the driver or the vehicle to perform a vehicle maneuver.

11. The method of claim 1, further comprising:
    forecasting, based on the perspective image data, alertness of one or more of the occupants of the vehicle; and wherein the automatically distributing the notification relating to the vehicle event is based, at least in part, on the forecasted alertness of the one or more occupants of the vehicle.

12. A computer program product for facilitating navigating one or more vehicle events, the computer program product comprising:
   at least one non-transitory computer readable storage medium readable by a processor and storing instructions for performing a method comprising:
      detecting, by the processor, a vehicle event of the one or more vehicle events based on image data received from one or more cameras of a plurality of cameras associated with the vehicle;
      automatically distributing, by the processor, a notification relating to the vehicle event to occupants of the vehicle;
      determining, by the processor, a view of an occupant of the occupants of the vehicle, the view of the occupant being determined based on perspective image data, indicative of the view of the occupant, from a camera of the plurality of cameras;
      adjusting at least one camera of the plurality of cameras based on at least a portion of the notification distributed and the perspective image data;
      obtaining, based on the adjusting, additional image data on the vehicle event from one of the plurality of cameras; and
      automatically taking an action to facilitate navigating the vehicle event, the automatically taking the action being based on at least a portion of the additional image data.

13. The computer program product of claim 12, wherein the method further comprises forecasting, based on the perspective image data, alertness of the occupant of the vehicle, and wherein the adjusting the at least one camera is based on the forecasting.

* * * * *